United States Patent [19]
Duell et al.

[11] Patent Number: 5,801,311
[45] Date of Patent: Sep. 1, 1998

[54] ROTARY DRIVE ACCELERATOR

[75] Inventors: David Lee Duell, Scotts Valley; Eric Alan Smith, Santa Cruz, both of Calif.

[73] Assignee: Seagate Technology, Inc., Scotts Valley, Calif.

[21] Appl. No.: 846,278

[22] Filed: Apr. 30, 1997

[51] Int. Cl.$^6$ .................................................. G01P 15/00
[52] U.S. Cl. ........................ 73/514.37; 73/488; 360/77.02
[58] Field of Search ............................... 73/11.04, 11.08, 73/11.09, 488, 504.07, 504.09, 504.12, 514.03, 514.15, 514.16, 514.37, 514.24; 360/73.03, 77.02

[56] References Cited

U.S. PATENT DOCUMENTS

| | | | |
|---|---|---|---|
| 4,947,093 | 8/1990 | Dunstan et al. | 360/73.04 |
| 5,404,257 | 4/1995 | Alt | 360/105 |
| 5,452,612 | 9/1995 | Smith et al. | 73/514.34 |
| 5,663,847 | 9/1997 | Abramovitch | 360/77.02 |
| 5,696,645 | 12/1997 | Laughlin | 360/75 |

*Primary Examiner*—Max H. Noori
*Attorney, Agent, or Firm*—Fliesler, Dubb, Meyer & Lovejoy LLP

[57] ABSTRACT

A rotary shock testing system including a rotating table mounted to a bearing plate of a precision bearing assembly. The bearing plate to which the rotating table is attached preferably includes upper and lower surfaces supported against ported plates to thereby prevent vertical translation of the bearing plate along the axis of rotation. Oil is injected through ports in the ported plates to provide a substantially frictionless hydrostatic bearing between the upper and lower surfaces of the bearing plate and respective surfaces of the ported plates. The precision bearing further includes a pair of tapered bearings and a roller bearing, spaced along the axis of rotation, which bearings further support the bearing plate for substantially frictionless rotation while preventing translation in a direction perpendicular to the axis of rotation and precession of the axis of rotation. The tapered bearings further assist in preventing vertical translation of the bearing plate along the axis of rotation. A shock generation and delivery system for delivering a shock to the rotating table includes a pneumatic cylinder storing a pressurized gas, and a lever for receiving a shock generated by the pressurized gas within the pneumatic cylinder, and delivering the shock to the rotating table.

21 Claims, 5 Drawing Sheets

ROTARY DRIVE ACCELERATOR

BACKGROUND OF THE INVENTION

1. Field of the Invention

The present invention relates to a rotary shock device for testing performance of mechanisms such as disk drives upon application of a rotary shock, and in particular, to a rotary shock device for applying a repeatable and controllable load to a table supported by a precision bearing assembly.

2. Description of Related Art

Due largely to the portability of present day computers and the importance of a computer's ability to withstand shock, finite element analysis and testing of a disk drive's ability to withstand shock has become a critical step in disk drive design. Within the area of shock testing of disk drives, it has been determined that rotary shock, i.e., one causing rotation of a disk drive, can be far more destructive than pure translational shock along the X, Y or Z axis. For example, a rotational shock is much more likely to cause undesired pivoting of the actuator arm within a disk drive than would a pure translational shock. Such undesired pivoting of the actuator arm may break the arm free from its latched or parked position during nonoperational periods of the drive, potentially allowing damaging contact between the head and disk. It may also cause off-tracking of the head with respect to the disk during operational periods of the drive. Disk drive manufacturers therefore commonly perform rotary shock testing on disk drives during the design verification and/or drive qualification phases of manufacturing to ensure that disk drives can withstand requisite levels of rotary shock.

Rotary shock tables are therefore conventionally available for simulating rotary shocks to which a disk drive may be subjected to during normal use. One such rotary shocker is manufactured by GHI Systems, Inc., San Pedro, Calif. 90732. Such systems in general employ a circular table rotationally mounted to a support surface, and a shock delivery mechanism tangentially mounted to an outer circumference of the table. A drive to be tested is mounted on top of the rotating circular table. The table may include a wedge affixed to an outer circumference of the table, against which wedge the shock delivery mechanism may discharge to thereby cause rotation of the table and the disk drive mounted thereon.

Conventional rotary shock systems have several drawbacks. For example, rotating tables found in the prior art tend to vibrate and/or precess upon application of a rotary shock to the outer circumference of the table. As seen for example in FIG. 1, a rotating table 10 by itself has a center of mass $cm_1$. However, once a drive 12 to be tested is mounted on table 10 by a fixture 14, the center of mass of the entire system now shifts from $cm_1$ to $cm_2$. Application of a rotary shock to a wedge 16 affixed to an outer circumference of table 10 is not aligned in the plane of the center of mass $cm_2$ of the system. This results in vibration of the system upon application of the rotary shock and/or precession of the axis of rotation 18 to axes 19 (shown exaggerated for clarity). This vibration and/or precession results in a dampening of a shock applied to the table. Moreover, the gyroscopic moment resulting from precession of the axis of rotation to axes 19 introduces additional forces on the rotating table and drive, which additional forces tend to further obscure the effect on the disk drive of the rotary shock itself.

Another shortcoming of conventional shock testing systems relates to the uncontrolled variability of the shock delivery system. Conventional systems employ a spring-based system for delivering a shock to the rotary table upon release of a compressed spring. A problem with such spring-based systems is that the spring constant of the spring tends to change over the life of the spring. Therefore, with usage of such conventional systems, the force manually set by controls on a shock delivery system will not be the force in fact delivered by the spring. Moreover, as different springs will wear differently over time, it is very difficult to accommodate for this difference in the expected versus actual force delivered by such spring-based systems.

SUMMARY OF THE INVENTION

It is therefore an advantage of the present invention to provide a precision rotary accelerator for shock testing disk drives wherein the effects of a particular applied shock may be accurately tested.

It is a further advantage of the present invention to provide a rotary table including a bearing assembly designed to result in pure rotation of the table upon application of a rotary shock to an outer circumference of the table.

It is another advantage of the present invention to provide a rotary table including a bearing assembly supporting the table for substantially frictionless rotation while preventing translation along the axis of rotation and translation in directions perpendicular to the axis of rotation.

It is a further advantage of the present invention to provide a shock delivery system capable of delivering the precise shock for which the system is manually set.

Is a still further advantage of the present invention to provide mechanisms for controllably varying the amount of rotary shock imparted to a disk drive being tested.

These and other advantages are accomplished by the rotary shock testing system according to the present invention. In a preferred embodiment, the shock testing system includes a rotating table mounted to a bearing plate of a precision bearing assembly. The bearing plate to which the rotating table is attached preferably includes upper and lower surfaces supported against ported plates to thereby prevent vertical translation of the bearing plate along the axis of rotation. Oil is injected through ports in the ported plates to provide a substantially frictionless hydrostatic bearing between the upper and lower surfaces of the bearing plate and respective surfaces of the ported plates. The precision bearing further includes a pair of tapered bearings and a roller bearing, spaced along the axis of rotation, which bearings further support the bearing plate for substantially frictionless rotation while preventing translation in a direction perpendicular to the axis of rotation and precession of the axis of rotation. The tapered bearings further assist in preventing vertical translation of the bearing plate along the axis of rotation.

The present invention further includes a lever pivotally mounted in the system, having a first end capable of applying a force to a wedge affixed to an outer circumference of the rotating table and a second end capable of receiving a force from a shock generation module. The shock generation module in a preferred embodiment of the invention comprises a pneumatic cylinder which may be precisely controlled to deliver a desired shock to the lever upon each test of a disk drive. The pneumatic cylinder includes a piston releasably driven by high pressure gas concentration within the cylinder. Unlike conventional springbased systems, the gas concentration, and hence the force imparted by the piston, may be precisely controlled for each shock test. The pneumatic cylinder is preferably mounted on tracks, so that the piston of the cylinder may exert a force on the lever at different distances from the lever axis of rotation. Thus, the torque created within the lever, and consequently the force exerted on the rotary table, may be varied both by varying the gas pressure within the cylinder and by varying the position at which the cylinder piston strikes the lever.

BRIEF DESCRIPTION OF THE DRAWINGS

The present invention will now be described with reference to the figures, in which.

DETAILED DESCRIPTION

The invention will now be described with reference to FIGS. 3–5, which in general relate to a rotary accelerator for testing how devices respond to a rotary shock. Although the invention is described hereinafter for testing Winchester-type disk drives, it is understood that the present invention may be used to test the effect of a rotary shock on various instruments, including for example CD players, pacemakers, cellular telephones, pagers, and automotive airbag sensors.

Figure 1:
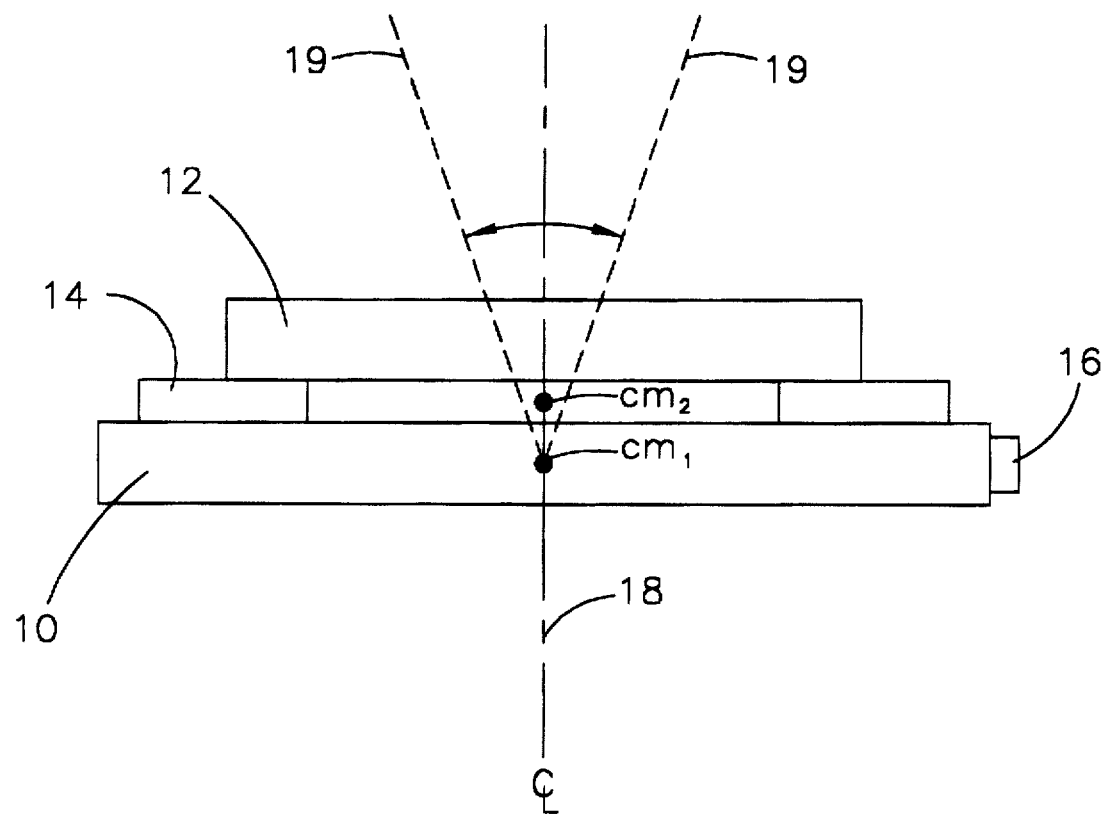
FIG. 1 is a side view of a conventional rotary shock table.
Figure 2:
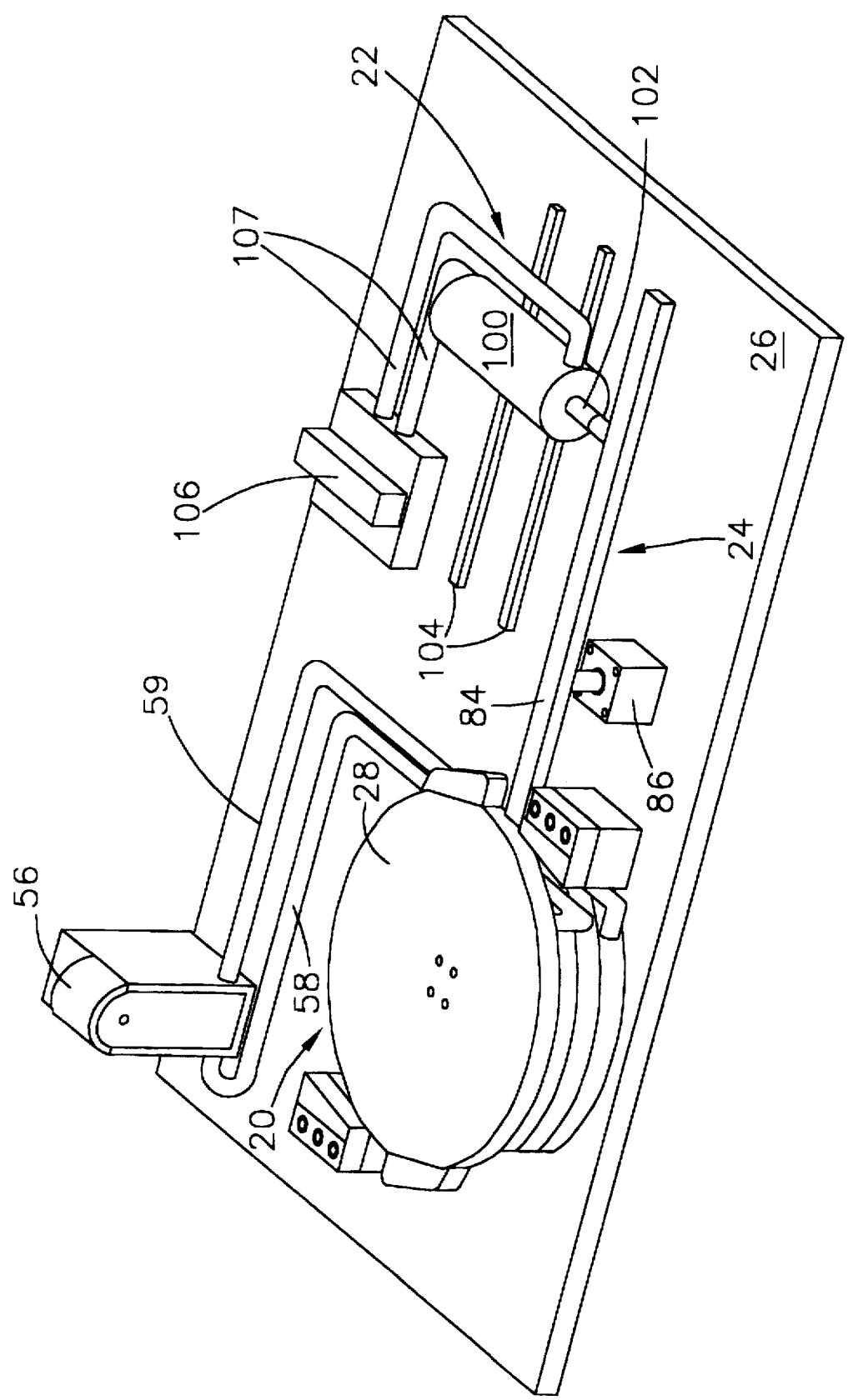
FIG. 2 is a perspective view of the rotary shock system according to the present invention.

Referring now to FIG. 2, the present invention in general includes a rotating table 20 which is made to rotate by a shock generation module 22 acting on a shock delivery system 24. The rotating table 20, shock generation module 22, and shock delivery system 24 may all be mounted on a stationary support platform 26.

Figure 3:
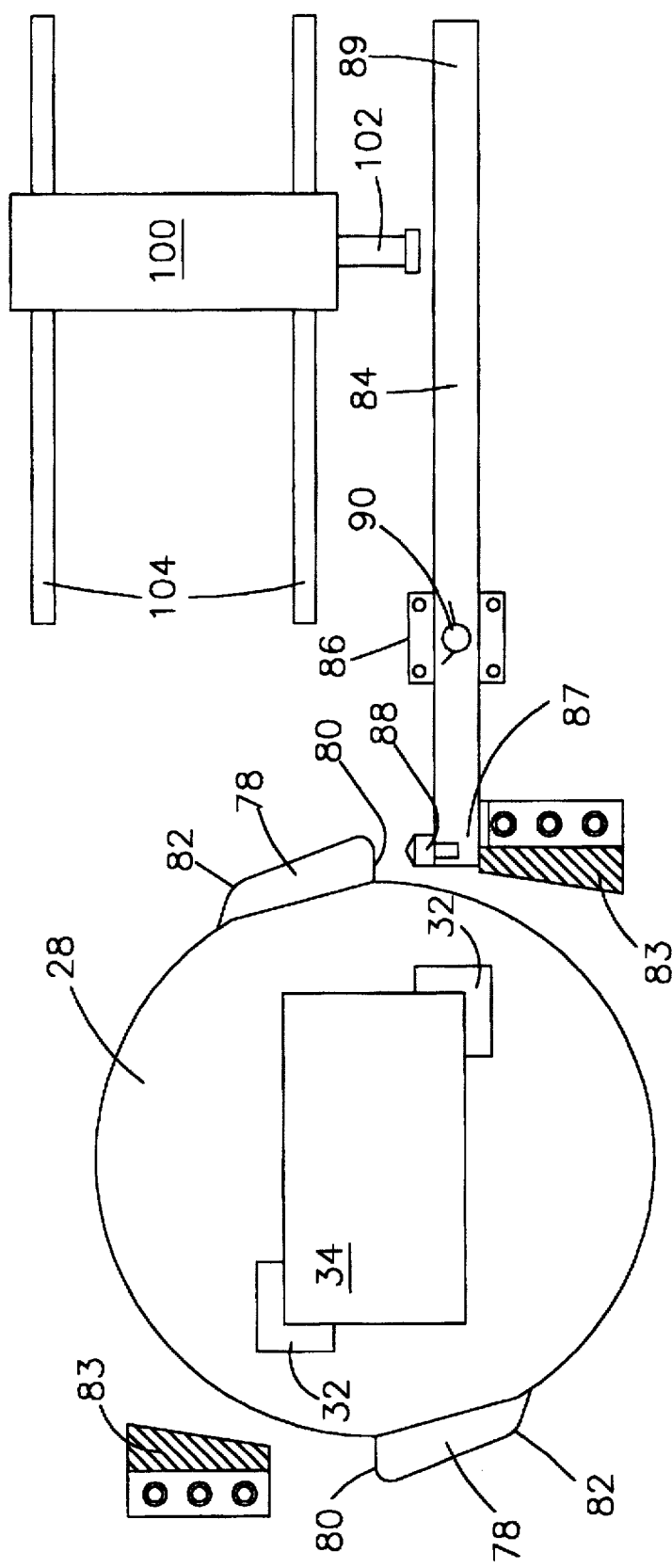
FIG. 3 is a top view of the rotary shock system according to the present invention.

As seen in FIGS. 2–5, rotating table 20 comprises a rotating table top 28 mounted to a bearing assembly 30. As best seen in FIG. 3, rotating table top 28 includes fixtures 32 for securing a mechanism such as disk drive 34 to the rotating mounting surface. It is understood that the location and configuration of fixtures 32 on table top 28 may vary depending on the size and configuration of the mechanism to be shock tested. Where a disk drive is being tested, the fixtures may preferably support the disk drive on table top 28 such that the pivot axis of the actuator assembly within the disk drive is coaxial with the axis of rotation of the table 20. It is understood, however, that the fixture 32 may mount the disk drive 34 in other locations. For example, the fixture 32 may alternatively mount the geometric center of the disk drive over the axis of rotation of table 20 in an alternative embodiment of the invention.

Figure 4:
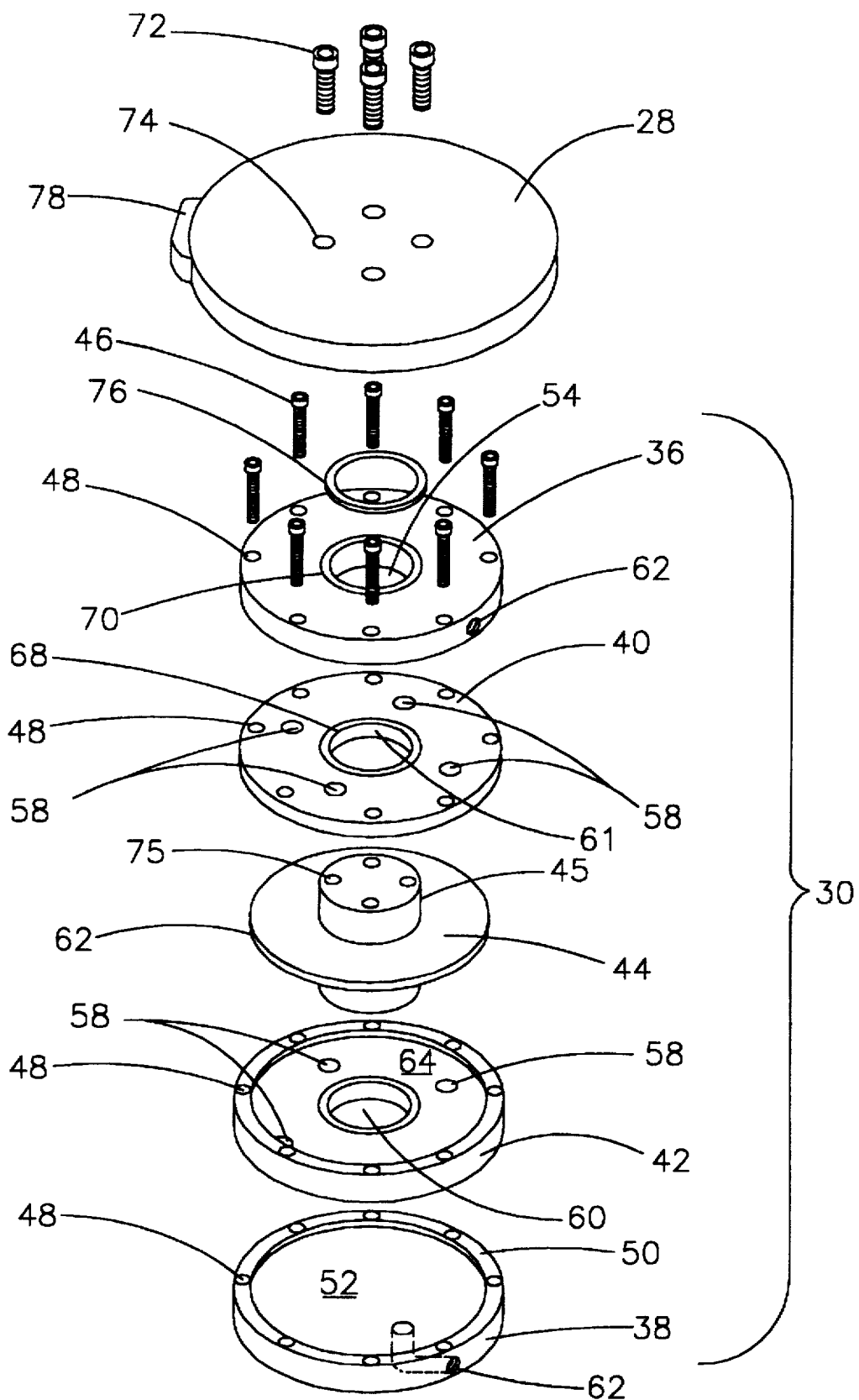
FIG. 4 is an exploded perspective view of the rotating table and bearing assembly according to the present invention.
Figure 5:
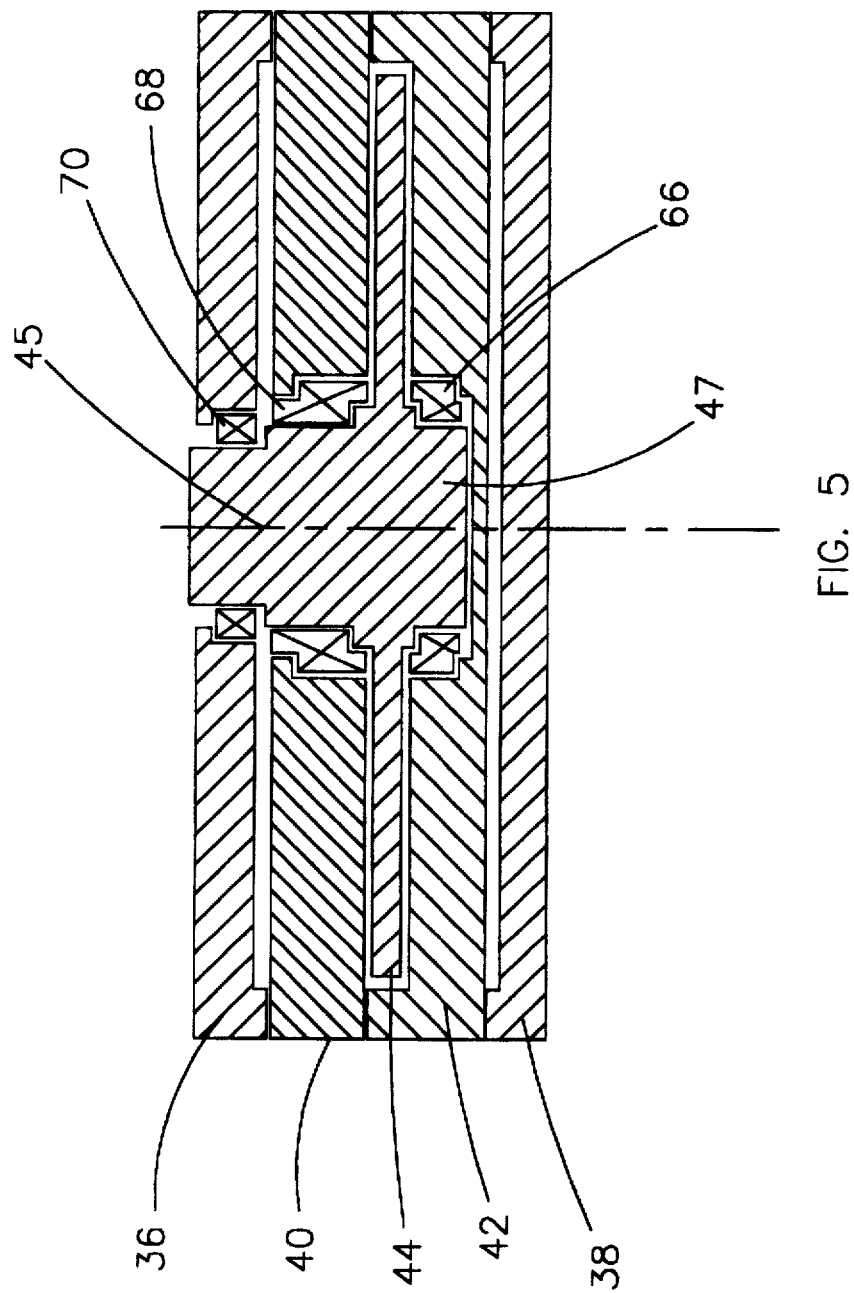
FIG. 5 is a side view of the rotating table and bearing assembly according to the present invention.

As best seen in FIGS. 4 and 5, bearing assembly 30 may include upper and lower reservoir plates 36 and 38, respectively, upper and lower ported plates 40 and 42, respectively, and bearing plate 44. Upper and lower reservoir plates 36 and 38, and upper and lower ported plates 40 and 42 are fixedly mounted to each other via a plurality of screws 46 received within respective screw holes 48 provided around the outer circumference of the plates 36–42. Screws 46 may be of sufficient length to fit through the bearing assembly and into threaded holes within support platform 26 so as to stationarily mount plates 36–42 to support platform 26. It is understood that alternative fastening means may be used to fasten the plates 36–42 onto the support platform 26. The bearing plate 44 is rotationally supported within bearing assembly 30, sandwiched between upper and lower ported plates 40 and 42 as explained hereinafter.

Upper and lower reservoir plates include a raised lip 50 around the outer circumference of the plates so as to define a recessed area, or reservoir, 52 within each reservoir plate. The reservoir 52 in the upper reservoir plate is not shown, however, it is similar to the reservoir 52 in the lower reservoir plate, with the exception that the upper reservoir plate includes a central aperture 54 as described hereinafter. During operation, oil from an oil pump 56 (FIG. 2) is pumped through lines 58 and 59 into the upper and lower reservoirs 52, respectively. As would be appreciated by those of skill in the art, the oil may be of various types having a viscosity sufficient for proper lubrication, while still being suitable for use with the pump 56. It is appreciated that lubricants other than oil may be used in alternative embodiments of the invention. The oil from lines 58 and 59 enter into the upper and lower reservoirs 52 through inlets 62 provided through the walls in the upper and lower reservoir plates.

Referring now to the upper and lower ported plates 40 and 42, in addition to screw holes 48, the plates 40 and 42 additionally include hydrostatic bearing ports 58 through the major surfaces of the plates. Four such ports may be provided within each plate in a preferred embodiment, but the number of ports may be greater or lesser than that in alternative embodiments of the invention. The lower ported plate includes a lip around an outer circumference to define a shallow well 64 in the lower ported plate. When the bearing assembly 30 is sealed together, a disk portion 62 of the bearing plate 44 fits within the well 64, so that upper and lower surfaces of the disk portion 62 lie juxtaposed to the upper ported plate 40 and lower ported plate 42, respectively. The annular detent 64 and the disk portion 62 are sized such that the disk portion 62 may rest snugly within the annular well 64 when the upper and lower ported plates are sealed to each other. It is understood that the upper ported plate may include an outer circumferential lip to define the well 64 in the upper ported plate instead of the lower ported plate as described above. As a further alternative, both the upper and lower ported plates may include slight lips, so that the ported plates together define the well 64.

The pressurized oil from the upper and lower reservoirs is forced through ports 58 in the upper and lower ported plates to create a hydrostatic bearing against the upper and lower disk surfaces of bearing plate 44. The hydrostatic bearing and the snug fit of the disk portion 62 within the well 64 allow substantially frictionless rotation of the bearing plate between the stationary upper and lower ported plates, but prevents vertical translation of the bearing plate relative to the upper and lower ported plates.

To further stabilize the bearing assembly 30, the bearing plate 44 includes a lower hub 47 fitting within an annular depression 60 in the lower ported plate 42. Although not a preferred embodiment, the depression 60 may alternatively be replaced by an annular aperture extending completely through the lower ported plate 42. The lower ported plate 42 further includes a tapered annular bearing 66 rotatably mounted within lower ported plate 42, within the annular depression 60. The depression 60 also receives the lower hub 47 therein such that the lower hub 47 lies in snug contact with the tapered bearing 66.

The upper ported plate 40 includes a central aperture 61, for receiving a second annular tapered bearing 68. The upper hub 45 of the bearing plate 44 protrudes through central aperture 61 and lies in snug engagement with tapered bearing 68.

As is known in the art, tapered bearings 66 and 68 are capable of allowing substantially frictionless motion of bearing plate 44 with respect to upper and lower ported plates 40 and 42, while substantially preventing movement of the bearing plate vertically along its axis of rotation and substantially preventing movement of the bearing plate horizontally in a plane perpendicular to the axis of rotation. (This is in contrast to a roller bearing which only prevents movement in a direction perpendicular to the axis of rotation.) Therefore, tapered bearing 66 in the lower ported plate rotationally supports the bearing plate 44, prevents the bearing plate from moving radially in a direction perpendicular to the axis of rotation, and prevents the bearing plate from moving downward with respect to the ported plates. Similarly, tapered bearing 66 in the upper ported plate 40 rotationally supports the bearing plate 44, prevents radial movement of the bearing plate in a direction perpendicular to the axis of rotation, and prevents upward movement of the bearing plate 44.

Upper reservoir plate 36 further includes annular roller bearing 70 rotationally mounted with respect to the plate 36 and defining central aperture 54. The upper hub 45 fits through the central aperture 54 in reservoir plate 36 in snug engagement with the roller bearing 70. When the bearing assembly 30 is fully assembled, a top surface of the upper hub 45 lies either flush with an upper surface of the upper reservoir plate 36 or slightly above the upper surface of the upper reservoir plate.

An elastomeric sealant may be provided between all contacting surfaces of respective components of the bearing assembly 30 to prevent the oil from the hydrostatic bearing from escaping the bearing assembly. Namely, the elastomeric sealant is provided between contacting surfaces of the lower hub 47 of bearing plate 44 and the inner diameter of tapered bearing 66; between contacting surfaces of the upper hub 45 of bearing plate 44 and the inner diameter of tapered bearing 68; and the contacting surfaces of the upper hub 45 and the inner diameter of roller bearing 70. Additionally, although screws 46 tightly hold the bearing assembly together, the elastomeric sealant may preferably also be provided between contacting surfaces of the plates of the bearing assembly. Namely, the elastomeric sealant may be provided between contacting surfaces at the outer diameter of lower reservoir plate 38 and lower ported plate 42; between contacting surfaces at the outer diameter of lower ported plate 42 and upper ported plate 40; and between contacting surfaces at the outer circumference of the upper ported plate 40 and the upper reservoir plate 36. As would be appreciated by those of skill in the art, various materials may be used as the elastomeric sealant, such as for example the compound sold under the trademark Sil-Flex®.

The table top 28 is preferably affixed to the bearing assembly 30 via a plurality of screws 72 fitting through holes 74 in the table top 28 and into threaded holes 75 in the top surface of upper hub 45. In a preferred embodiment, four such screws 72 may be used to secure the table top 28 to the bearing assembly 30. The holes 74 in the upper surface may be countersunk such that the tops of screws 72 do not protrude past the plane of table top 28. Although not critical, some embodiments of the invention may include an annular sealing ring 76 on top of roller bearing 70 to further ensure that none of the lubricant escapes from the bearing assembly.

As explained in the Background of the Invention section, conventional shock testing machines are incapable of performing accurate rotational shock testing in that the table would vibrate and/or precess upon application of the radial shock, thereby introducing unpredictable variables into the test. It is therefore a feature of the present invention to provide a particularly stable rotating table as a result of the bearing assembly 30 according to the present invention. In particular, the bearing plate 44, on which the rotating table top 28 is mounted, is prevented from precession and radial translation at several points along the axis of rotation; namely, at roller bearing 70, tapered bearing 68, and tapered bearing 66. Precession and radial translation is further prevented by the thin hydrostatic bearing layer between bearing plate 44 and the upper and lower ported plates. Similarly, vertical translation of the bearing plate is prevented at several locations within the bearing location; namely, by upper tapered bearing 68, lower tapered bearing 66, and the thin hydrostatic bearing layer between bearing plate 44 and the upper and lower ported plates. Therefore, upon application of a radial shock to the rotating table as explained hereinafter, the table undergoes substantially pure rotation without translation or precession. This allows accurate testing of the effects of an applied rotary shock on the disk drive being tested.

Shock receiving wedges 78 are fixedly mounted to the table top 28, projecting outward from the outer circumference of the table top 28. The wedges 78 may be mounted to the rotating table top 28 by conventional means such as for example screws provided through the wedges and into the table top. As best shown in FIG. 3, the wedges 78 include a first surface 80 for receiving the load from the shock delivery system 24, and a second surface 82 for frictionally engaging brakes 83 to stop rotation of the table 20. Testing of the effects of an applied rotary shock on a disk drive is complete within a half revolution of the table and disk drive. Therefore, the brakes 83 may thereafter stop rotation of the table.

Shock delivery system 24 in general comprises a lever 84 pivotally mounted to a base 86, and having a first end 87 and a second end 89. Base 86 is in turn mounted to support platform 26 via screws 91 (FIG. 3). A force exerted on lever 84 away from the lever axis of rotation produces a torque causing rotation of lever 84 about its axis of rotation. In a preferred embodiment, the axes of rotation of both table 20 and lever 84 are perpendicular to the surface of the support platform 26, so that the table and lever rotate in parallel planes. The lever 84 is mounted to the base 86 at a height such that a striker 88 located at first end 87 of the lever is at substantially the same elevation as the wedges 78. In an alternative embodiment of the invention, bearing assembly 30 may be sunken below the upper surface of platform 26 such that only rotating table top 28 and wedges 78 protrude above the surface of the platform 26. In this embodiment, base 86 may be omitted from the invention and lever 84 may be mounted to a shaft rotationally mounted directly within the platform 26. A helical spring 90 (shown partially in phantom in FIG. 3) may have a first end mounted against lever 84 and a second end mounted against base 86 so as to bias the lever into a rest position where the first end of the lever abuts against an upper surface of one of the brakes 83 as shown in FIG. 3. The lever 84 is preferably formed of a rigid, lightweight material, such as for example aluminum, having a rectangular cross-section. In alternative embodiments, the lever may have an I-beam cross-section to further reduce the mass of the lever. As would be appreciated by those of skill in the art, other lever configurations are possible.

The shock generation module 22 in a preferred embodiment of the invention comprises a pneumatic cylinder 100 having a piston 102 capable of delivering a shock to the end 89 of lever 84. The piston causes the lever to pivot, so that the striker 88 on first end 87 strikes a wedge 78 and causes table 20 to rotate. In a preferred embodiment of the invention, the striker 88 is formed of an elastomeric material, and the wedge 78 is preferably formed of aluminum. The cylinder 100 is translationally mounted in a known manner on tracks 104, which tracks are substantially parallel to the length of the lever 84 in its rest position. The tracks allow the pneumatic cylinder 100 to be translated so that the piston may strike the lever at different positions along its length, thereby varying the torque on lever 84 for a given force of the piston against the lever.

As is known in the art, gas from a source flows through a pressure regulator and into a reservoir (none of which are shown in the figures). The reservoir holds a ready volume of pressurized gas, which pressure is controlled by the pressure regulator. The pressurized gas flows from the reservoir, through the air valve 106, and into the pneumatic cylinder 100 via tubing 107. The air valve acts as a switch which is activated to deliver the pressurized gas to the cylinder to accelerate the piston. Tubing 107 is preferably formed of a flexible material, such as for example PTFE tubing, to allow the cylinder to translate on tracks 104. Embodiments of the present invention may further include a flow control valve (not shown) at the inlet to the pneumatic cylinder for further controlling the velocity of the gas inlet to the cylinder. The flow control valve is especially useful for lower pressures approaching atmospheric pressure.

Upon opening the air valve 106, the piston will accelerate and strike the lever with a force dictated by the pressure of the gas within the cylinder as set by the pressure regulator and, in some embodiments, with the flow control valve. Thus, the force delivered by the shock generation module 22, and consequently the force exerted by the lever on the rotating table, may be varied both by varying the location at which piston 102 strikes the lever 84, and by varying the magnitude of force with which piston 102 strikes the lever 84.

In a further embodiment of the invention, the location of the axis of rotation of the lever 84 may be moved on the support platform 26, while the position of the lever 84 remains stationary relative to the support platform. As explained above, the lever is mounted to a base 86, which is in turn mounted to the support platform by screws 91 (FIG. 3). By providing the support platform 26 with holes for receiving screws 91 at different locations, the base 86 may be affixed to the support platform at different locations. Additionally, by providing a plurality of holes (not shown) along the lever 84, when the position of the base 86 is adjusted, the lever may be rotationally reattached to the base 86 without having moved the position of the lever with respect to the support platform.

Such an embodiment allows the pulse width over which striker 88 contacts the wedge 78 to be varied upon application of a given rotary shock by the lever. The following example illustrates this point. In a first test, the pivot point of the lever is positioned in the center of the lever, e.g., the piston 102 and the striker 88 are both located 9 inches from the pivot axis. If the piston exerts a force of 1000 pounds on the lever, the striker will exert a like force of 1000 pounds on the rotating table. In a second test, the pivot point of the lever is positioned 16 inches away from the piston 102 and 2 inches away from the striker 88. If the piston in this test exerts a force of 125 pounds on the lever, the striker will exert a force of 125 lbs×16 ins÷2 ins=1000 pounds on the rotating table.

Thus, the force exerted on the rotating table by the lever in both the first and second tests will be 1000 pounds. However, the striker in the first test will strike the rotating table with a much higher velocity than in the second test. As previously indicated the striker is preferably formed of an elastomeric material. Therefore, the striker will remain in contact with the wedge 78 on the table for a shorter period of time, or pulse width, in the first test than in the second test. Thus, this embodiment of the present invention allows both the test force and test pulse width to be varied.

As explained in the Background of the Invention section, shock delivery systems employing springs to generate the applied shock have a disadvantage in that the spring constant of the spring changes over the life of the spring, and the force applied by the spring for a given spring compression will vary with time. However, the force applied by the pneumatic cylinder according to the present invention does not vary over the life of the cylinder. The pressure within the pneumatic cylinder may be precisely controlled by the pressure regulator and, in some embodiments, the flow control valve, and the force exerted by the piston will always be the same for a given air pressure within the cylinder. It is understood that other shock generation mechanisms may be used in the present invention. For example, the piston may be accelerated by a hydraulic system, solenoid, or other known systems. Additionally, although not a preferred embodiment, springs could be used to accelerate the piston.

In an alternative embodiment of the present invention, the point on the lever which is struck by the piston, and the point of the lever which strikes the rotating table may be located on the same side of the axis of rotation of the lever as each other. In this embodiment, the shock delivery mechanism is located on the opposite side of the lever from that shown in FIGS. 2 and 3 so as to still rotate the lever in the clockwise direction as shown in the figures. Moreover, in a further embodiment of the invention, the lever 84 may be omitted from the rotary accelerator. In this embodiment, the pneumatic cylinder may apply a shock directly to the rotating table.

The invention has been described thus far as incorporating manual settings. That is, the pressure regulator may be manually set, the location of the cylinder 100 on tracks 104 may be manually set, and the position of the pivot axis of the lever 84 may be manually set. However, in an alternative embodiment of the invention, the entire system may be automated. In this embodiment, the pressure regulator may be digitized and connected to a computer. Similarly, the cylinder may be mounted to a linear actuator which is controlled by the computer. Additionally, the base 86 may be mounted on a linear actuator controlled by the computer. As would be appreciated by those of skill in the art, the lever must be translationally and rotationally mounted on the base 86 in this embodiment, so that, as the base 86 translates along the support platform 26, the lever 84 remains stationary with respect to the support platform. Although this may be accomplished with several schemes, in one embodiment, the lever may be mounted on a computer-controlled linear actuator which is in turn rotationally mounted to base 86. Thus, the linear actuators for both the base 86 and lever 84 would work in tandem such that the base could translate while the lever remained stationary.

In this embodiment, it would be possible to set the system to perform multiple tests, to preset the amount of force to be applied to the rotating table, and to preset the pulse width over which the force is to be applied. The automated system according to this embodiment would at that point automatically adjust the system parameters to perform the requested tests to specification. Alternatively, the individual system parameters, such as pressure within the cylinder, the position of the cylinder, and the location of the lever pivot axis, could all be individually controlled and varied as desired according to this embodiment.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A rotary accelerator mounted to a support platform, the accelerator including a rotating table and a means for generating and delivering a shock to the rotating table, the rotary accelerator comprising:
    a bearing assembly to which the rotating table is affixed, the bearing assembly including:
        a first plate stationarily mounted with respect to the support platform, said first plate including a central aperture therethrough;
        a second plate stationarily mounted to the first plate, said second plate including a central depression formed at least partially therethrough, said first and second plates together defining a space therebetween;
        a bearing plate including a disk portion having a first surface and a second surface opposite said first surface, the bearing plate further including a first hub extending away from said first surface of said disk portion, and a second hub extending away from said second surface of said disk portion, said disk portion fitting within said space defined between said first and second plates, said first hub fitting within said central aperture in said first plate, and said second hub fitting within said depression in said second plate;
        a hydrostatic bearing provided within said space between said first surface of said disk portion and a juxtaposed surface of said first plate, and between said second surface and a juxtaposed surface of said second plate;
        a first annular bearing provided within said central aperture between said first hub and a portion of said first plate defining said central aperture; and
        a second annular bearing provided within said depression between said second hub and a portion of said second plate defining said depression;
        wherein said hydrostatic bearing, and said first and second annular bearings support said bearing plate for substantially frictionless rotation with respect to said first and second plates, and prevent radial and axial translation of said bearing plate with respect to said first and second plates.

2. A rotary accelerator as recited in claim 1, wherein said hydrostatic bearing, and said first and second annular bearings further prevent precession of an axis of rotation of said bearing plate.

3. A rotary accelerator as recited in claim 1, wherein at least one of said first and second annular bearings comprise a tapered bearing.

4. A rotary accelerator as recited in claim 1, wherein at least one of said first and second annular bearings comprise a roller bearing.

5. A rotary accelerator as recited in claim 1, further comprising a first reservoir plate mounted on a side of said first plate opposite said disk portion, a first reservoir being defined between said first reservoir plate and said first plate, said first reservoir storing a lubricant used as said hydrostatic bearing.

6. A rotary accelerator as recited in claim 5, said first plate including ports through which the first reservoir supplies said lubricant to said hydrostatic bearing.

7. A rotary accelerator as recited in claim 5, further comprising a second reservoir plate mounted on a side of said second plate opposite said disk portion, a second reservoir being defined between said second reservoir plate and said second plate, said second reservoir also storing said lubricant used as said hydrostatic bearing.

8. A rotary accelerator as recited in claim 7, said second plate including ports through which the second reservoir supplies said lubricant to said hydrostatic bearing.

9. A rotary accelerator as recited in claim 1, wherein the means for generating and delivering the shock to the rotating table comprises:
    a pneumatic cylinder having a pressurized gas therein; and
    a piston being energized by said pressurized gas.

10. A rotary accelerator as recited in claim 9, wherein the means for generating and delivering the shock to the rotating table further comprises a lever for receiving a shock from said piston and delivering said shock to the rotating table.

11. A rotary accelerator as recited in claim 10, wherein a position of said piston with respect to said lever may be varied.

12. A rotary accelerator as recited in claim 10, wherein a position of a pivot axis of said lever may be varied along said lever.

13. A rotary accelerator as recited in claim 1, wherein the means for generating and delivering the shock to the rotating table comprises:
    a hydraulic cylinder having a pressurized fluid therein; and
    a piston being energized by said pressurized fluid.

14. A rotary accelerator as recited in claim 1, wherein the means for generating and delivering the shock to the rotating table comprises:
    a solenoid; and
    a piston being energized by said solenoid.

15. A rotary accelerator, comprising:
    a support platform;
    a rotating table supported on said support platform;
    a means for generating and delivering a shock to the rotating table supported on said support platform; and
    a bearing assembly for rotationally mounting said rotating table to said support platform, said bearing assembly including:
        an upper ported plate stationarily mounted with respect to said support platform, said upper ported plate including a central aperture therethrough,
        a lower ported plate stationarily mounted to the upper ported plate, said lower ported plate including a central depression formed at least partially therethrough, said upper and lower ported plates together defining a space therebetween,
        a bearing plate including a disk portion having a first surface and a second surface opposite said first surface, the bearing plate further including a first hub extending away from said first surface of said disk portion, and a second hub extending away from said second surface of said disk portion, said disk portion fitting within said space defined between said upper and lower ported plates, said first hub fitting within said central aperture in said upper ported plate, and said second hub fitting within said depression in said lower ported plate, a hydrostatic bearing provided within said space between said first surface of said disk portion and a juxtaposed surface of said upper ported plate, and between said second surface and a juxtaposed surface of said lower ported plate, a first annular bearing provided within said central aperture between said first hub and a portion of said upper ported plate defining said central aperture, a second annular bearing provided within said depression between said second hub and a portion of said lower ported plate defining said depression, an upper reservoir plate mounted on a side of said upper ported plate opposite said disk portion, an upper reservoir being defined between said upper reservoir plate and said upper ported plate, said upper reservoir storing a lubricant used as said hydrostatic bearing, and a lower reservoir plate mounted on a side of said lower ported plate opposite said disk portion, a second reservoir being defined between said lower reservoir plate and said lower ported plate, said second reservoir also storing said lubricant used as said hydrostatic bearing, wherein said hydrostatic bearing, and said first and second annular bearings support said bearing plate for substantially frictionless rotation with respect to said upper and lower ported plates, and prevent radial and axial translation of said bearing plate with respect to said upper and lower ported plates.

16. A rotary accelerator mounted to a support platform, comprising:

a rotating table including a bearing assembly and a table top mounted thereon, the bearing assembly including:

a first plate stationarily mounted with respect to the support platform, said first plate including a central aperture therethrough;

a second plate stationarily mounted to the first plate, said second plate including a central depression formed at least partially therethrough, said first and second plates together defining a space therebetween;

a bearing plate including a disk portion having a first surface and a second surface opposite said first surface, the bearing plate further including a first hub extending away from said first surface of said disk portion, and a second hub extending away from said second surface of said disk portion, said disk portion fitting within said space defined between said first and second plates, said first hub fitting within said central aperture in said first plate, and said second hub fitting within said depression in said second plate;

a hydrostatic bearing provided within said space between said first surface of said disk portion and a juxtaposed surface of said first plate, and between said second surface and a juxtaposed surface of said second plate;

a first annular bearing provided within said central aperture between said first hub and a portion of said first plate defining said central aperture; and a second annular bearing provided within said depression between said second hub and a portion of said second plate defining said depression;

wherein said hydrostatic bearing, and said first and second annular bearings support said bearing plate for substantially frictionless rotation with respect to said first and second plates, and prevent radial and axial translation of said bearing plate with respect to said first and second plates;

a shock delivery system pivotally mounted to the support platform for causing said rotating table to rotate, said shock delivery system including a lever having a variable pivot axis with respect to a length of said lever; and a shock generation module including a means for regulating a pressure within the module, and a piston propelled against said lever by said regulated pressure, said piston capable of striking said lever at a variable location along a length of said lever.

17. A rotary accelerator as recited in claim 16, wherein said means for regulating said pressure, said position of said variable pivot axis with respect to a length of said lever, and said variable location at which said piston strikes said lever may be manually set.

18. A rotary accelerator as recited in claim 16, wherein said means for regulating said pressure, said position of said variable pivot axis with respect to a length of said lever, and said variable location at which said piston strikes said lever may be automatedly set.

19. A rotary accelerator mounted to a support platform, comprising:

a rotating table including a bearing assembly and a table top mounted thereon;

a shock delivery system pivotally mounted to the support platform for causing said rotating table to rotate, said shock delivery system including a lever having a variable pivot axis with respect to a length of said lever; and a shock generation module including a means for regulating a pressure within the module, and a piston propelled against said lever by said regulated pressure, said piston capable of striking said lever at a variable location along a length of said lever.

20. A rotary accelerator as recited in claim 19, wherein said means for regulating said pressure, said position of said variable pivot axis with respect to a length of said lever, and said variable location at which said piston strikes said lever is manually set.

21. A rotary accelerator as recited in claim 19, wherein said means for regulating said pressure, said position of said variable pivot axis with respect to a length of said lever, and said variable location at which said piston strikes said lever is automatedly set.

* * * * *